(12) United States Patent
Iida

(10) Patent No.: US 8,488,274 B2
(45) Date of Patent: Jul. 16, 2013

(54) SLIDING MEMBER FOR RECORDING MEDIA

(75) Inventor: Hiroyuki Iida, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 1200 days.

(21) Appl. No.: 10/802,868

(22) Filed: Mar. 18, 2004

(65) Prior Publication Data

US 2004/0201922 A1  Oct. 14, 2004

(30) Foreign Application Priority Data

Apr. 9, 2003 (JP) ................................. 2003-105196

(51) Int. Cl.
*G11B 5/78* (2006.01)
*G11B 5/82* (2006.01)

(52) U.S. Cl.
USPC ........... 360/134; 360/135; 428/41.8; 428/343

(58) Field of Classification Search
USPC ................... 360/230, 224, 234, 234.6, 235.4, 360/235.1, 235.3, 260, 235, 134, 135; 428/694, 428/40.1, 41.8, 141, 143, 147, 323, 343, 428/354, 355 R, 355 RA
See application file for complete search history.

(56) References Cited

U.S. PATENT DOCUMENTS

| | | | | |
|---|---|---|---|---|
| 4,796,127 A | * | 1/1989 | Wada et al. | 360/235.3 |
| 5,253,232 A | * | 10/1993 | Akagi et al. | 369/13.17 |
| 5,657,300 A | * | 8/1997 | Takahashi | 369/13.17 |
| 5,677,053 A | * | 10/1997 | Moriga et al. | 428/347 |
| 6,289,640 B1 | * | 9/2001 | Ueda et al. | 52/167.9 |
| 6,435,128 B2 | * | 8/2002 | Qiu et al. | 116/207 |
| 6,540,865 B1 | * | 4/2003 | Miekka et al. | 156/249 |
| 6,803,099 B1 | * | 10/2004 | Anspach | 428/343 |
| 7,007,355 B2 | * | 3/2006 | Ikeda et al. | 29/25.35 |
| 2003/0007288 A1 | * | 1/2003 | Kasajima et al. | 360/234.6 |
| 2003/0091815 A1 | * | 5/2003 | Buccellato et al. | 428/343 |
| 2003/0198773 A1 | * | 10/2003 | Miekka et al. | 428/41.8 |
| 2004/0118305 A1 | * | 6/2004 | Martinez et al. | 101/127 |

FOREIGN PATENT DOCUMENTS

| | | | | |
|---|---|---|---|---|
| JP | 59117756 A | * | 7/1984 | |
| JP | 02-107818 A | | 4/1990 | |
| JP | 02214647 A | * | 8/1990 | |
| JP | 04366478 A | * | 12/1992 | |
| JP | 8-31128 A | | 2/1996 | |
| JP | 08-034959 A | | 2/1996 | |
| JP | 08-34959 A | | 2/1996 | |
| JP | 10-212461 A | | 8/1998 | |
| JP | 11-134838 A | | 5/1999 | |
| JP | 2001-148175 A | | 5/2001 | |

(Continued)

OTHER PUBLICATIONS

English-Machine translation of JP 08-031128 A to Nagai et al., published on Feb. 2, 1996.*

(Continued)

*Primary Examiner* — Will J Klimowicz
(74) *Attorney, Agent, or Firm* — Sughrue Mion, PLLC

(57) ABSTRACT

A sliding member comprising a slidable substrate and a pressure-sensitive adhesive layer provided on one side thereof, wherein the slidable substrate is a porous form comprising a plastic, and a barrier layer is provided between the slidable substrate and the pressure-sensitive adhesive layer. The sliding member has good sliding property and even when a load is applied thereto over a long period of time, can suppress exudation of the pressure-sensitive adhesive.

7 Claims, 1 Drawing Sheet

FOREIGN PATENT DOCUMENTS

| | | |
|---|---|---|
| JP | 2002-166401 A | 6/2002 |
| TW | 338555 | 8/1998 |
| TW | 355196 | 4/1999 |
| TW | 475802 | 2/2002 |
| WO | WO 9626251 A1 * | 8/1996 |

OTHER PUBLICATIONS

English-Machine translation of JP 08-034959 A to Nakanishi, published on Feb. 6, 1996.*

English-Machine translation of JP 2002-166401 A to Tsubouchi et al., published on Jun. 11, 2002.*

Office Action from Japanese Patent Office mailed on Jun. 4, 2007.

Taiwanese Office Action dated Mar. 10, 2010 in Taiwanese application No. 093109457.

Final Rejection issued Sep. 22, 2011 by the Korean Intellectual Property Office in counterpart Korean Patent Application 10-2004-0024000.

Notice of Result of Mandatory Reexamination, issued Feb. 27, 2012 by the Korean Intellectual Property Office in counterpart Korean Application No. 10-2004-0024000.

Korean Office Action issued in Application No. 10-2004-0024000; dated Feb. 28, 2011.

Communication dated Apr. 13, 2012 issued by the Korean Patent Office in counterpart Korean Application No. 2004-24000.

* cited by examiner

FIG. 2
CONVENTIONAL
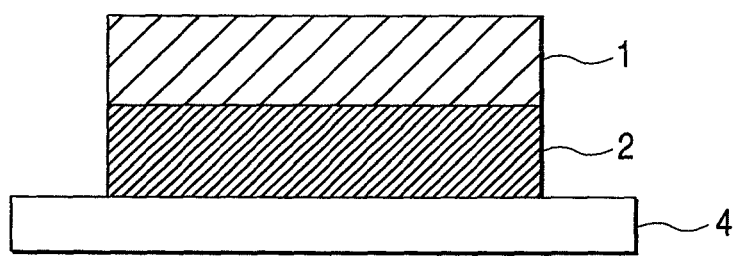

US 8,488,274 B2

SLIDING MEMBER FOR RECORDING MEDIA

FIELD OF THE INVENTION

The present invention relates to a sliding member. The sliding member is suitably used for recording media having a rotating body such as discs or tapes, and drive units or recording units thereof, and the like.

DESCRIPTION OF THE RELATED ART

In recording media having a rotating body such as VTR, FD or MO and recording units for driving them to read or write data, it has hitherto been carried out to dispose a plastic material having excellent sliding property between the rotating body and a supporting section thereof. For example, polytetrafluoroethylene (hereinafter referred to as "PTFE" for brevity) and ultrahigh molecular weight polyethylene (hereinafter referred to as "UHMWPE" for brevity) are used as the slidable material. Further, it is known that porous sheets of such a plastic material are suitable as the slidable material because of excellent coefficient of friction thereof (for example, see JP-A-2001-148175).

A pressure-sensitive adhesive layer is laminated on the slidable material, and the laminate is provided for use. However, if a load is applied to a sliding member comprising a porous sheet of PTFE or UHMWPE having a pressure-sensitive adhesive layer provided thereon over a long period of time, a phenomenon occurs that the pressure-sensitive adhesive exudes from pores of the porous sheet. In such a state, slide does not occur between the sliding member and a part (rotating body) causing movement such as rotation, whereby the sliding member cannot exhibit its performance.

SUMMARY OF THE INVENTION

An object of the present invention is to provide a sliding member which has good sliding property and even when a load is applied thereto over a long period of time, can suppress exudation of a pressure-sensitive adhesive.

As a result of extensive and intensive investigations to overcome the above problems, it has been found that the above object can be achieved by a specific sliding member described below. The present invention is completed based on this finding.

The sliding member according to the present invention comprises a slidable substrate and a pressure-sensitive adhesive layer provided on one side thereof, wherein the slidable substrate is a porous form comprising a plastic, and a barrier layer is provided between the slidable substrate and the pressure-sensitive adhesive layer.

Thus, the slidable substrate uses a porous form comprises a plastic and therefore has excellent sliding property. Further, the barrier layer is provided between the slidable substrate and a pressure-sensitive adhesive layer, and this can suppress movement of a pressure-sensitive adhesive from the pressure-sensitive adhesive layer even under a loading condition.

BRIEF DESCRIPTION OF THE DRAWINGS

FIG. 2 is a cross-sectional view showing one example of the conventional sliding member.

Figure 1:
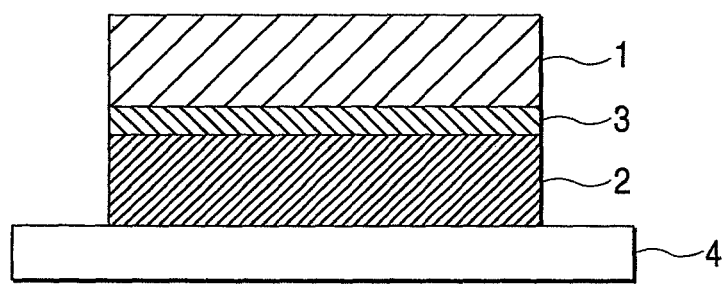
FIG. 1 is a cross-sectional view showing one example of a sliding member of the present invention.

In the drawings:
1: Slidable substrate
2: Pressure-sensitive adhesive layer
3: Barrier layer
4: Separator

DETAILED DESCRIPTION OF THE INVENTION

The embodiment of the present invention is described below with reference to the accompanying drawings.

FIG. 1 is a cross-sectional view showing one example of the sliding member according to the present invention, in which a pressure-sensitive adhesive layer 2 is provided on one side of a slidable substrate 1 via a barrier layer 3. The pressure-sensitive adhesive layer 2 can be provided with a separator 4.

FIG. 2 is a cross-sectional view showing one example of the conventional sliding member, in which the pressure-sensitive adhesive layer 2 is provided directly on one side of the slidable substrate 1.

The slidable substrate used in the present invention is a porous form comprising a plastic. Since the slidable substrate is required to have sliding property against other parts, a material having a low coefficient of friction is used. For example, the coefficient of friction is 0.2 or lower, and preferably 0.1 or lower. Suitable examples of the plastic having sliding property include polytetrafluoroethylene (PTFE) and ultrahigh molecular weight polyethylene (UHMWPE). UHMWPE having a low coefficient of friction and excellent abrasion resistance is preferably used. The UHMWPE also has an advantage such that its cost is low. Such a plastic having sliding property is formed into a porous sheet form and used as the slidable substrate.

The porous sheet using UHMWPE will be described below. UHMWPE has a molecular weight exceeding 500,000, and preferably exceeding 1,000,000. Examples of such UHMWPE include Hizex Million (manufactured by Mitsui Chemicals, Inc.) and Hostalen GUR (manufactured by Ticona), that are commercially available. The molecular weight as referred to in the present invention means a measured value by the viscometry.

Examples of a method of preparing the porous sheet of UHMWPE include an extraction method and a sintering method. Of those methods, the sintering method described in JP-B-5-66855 is preferable from the standpoints of reduction in coefficient of friction and uniformity of pore size of a porous sheet prepared.

The sintering method described in the above-cited patent document will be described below. First of all, an UHMWPE powder is charged in a mold, heated at a temperature lower than the melting point of UHMWPE, and pressurized to prepare a preform. The preform is allowed to stand in an atmosphere of vacuum to remove air. The preform thus treated is sintered in a steam atmosphere heated at a temperature of the melting point or higher of UHMWPE, and then cooled to prepare a porous form of UHMWPE.

The sintering method will be described in more detail below. An UHMWPE powder is charged in a mold and heated. The heating must be carried out at a temperature lower than the melting point of the UHMWPE powder. Usually, the heating temperature is preferably within a range of 20° C. lower than the melting point. The heating time is appropriately determined depending upon the heating temperature. In general, the heating time is preferably in a range of 30-60 minutes per cm of the thickness of a preform formed in the mold.

After heating, the UHMWPE powder charged in the mold is pressurized to prepare a preform. In general, the pressurization can be carried out under a pressure of about $0.3 \times 10^5$ to $40 \times 10^5$ Pa while adjusting a height of the UHMWPE powder charged in the mold. There is the following relationship among a weight of the preform formed in the mold (weight of UHMWPE powder charged in the mold), a bottom area of the preform (usually equal to a bottom area of the mold) and a specific gravity of the preform (apparent density). Weight=Bottom area×Height×Specific gravity (Apparent density). Accordingly, it is possible to determine the specific gravity (apparent density) of the preform by setting up the height of the UHMWPE powder charged in the mold at a prescribed value by the pressurization. That is, where the weight of the UHMWPE powder to be charged is made equal using the same mold, the higher the charge height, the smaller the specific gravity of the obtained preform is. In the present invention, it is preferable in point of workability to adjust the charge height such that the specific gravity (apparent density) falls within the range of about 0.23-0.78 (porosity is about 15-75%).

The specific gravity (apparent density) of a porous form obtained by the sintering method is a close relationship with the specific gravity (apparent density) of a preform if other conditions are identical. The higher the specific gravity (apparent density) of the preform, the higher the specific gravity (apparent density) of the porous form using the same is. It can be said from this fact that the pressurization is a step for determining the specific gravity (apparent density) of the porous form. Where the specific gravity (apparent density) of the preform obtained by the pressurization step is set up at the above-specified range, a porous form having a specific gravity (apparent density) of about 0.28-0.74 (porosity: about 20-70%) is obtained although slightly varying depending on conditions of the subsequent steps. The porosity can be calculated from the specific gravity (apparent density) of the preform or porous form according to the following equation:

$$\text{Porosity (\%)} = \{1 - (\text{Apparent specific gravity}) / (\text{True specific gravity of UHMWPE})\} \times 100.$$

The preform obtained by the pressurization step is subjected to deaeration treatment in a vacuum atmosphere, whereby air within the pores of the preform is removed. The deaeration treatment used is, for example, a method in which the preform is taken out of the mold, placed in a pressure container, and then subjected to vacuum treatment. The vacuum atmosphere is usually in the range of about 13.3-1,330 Pa.

The preform having been subjected to deaeration treatment is sintered in a steam atmosphere heated at a temperature of the melting point or higher of UHMWPE. During sintering, the preform is in a deaerated state as described above, and the steam is usually pressurized. Therefore, the steam easily enters the preform and rapidly transmits heat, whereby the preform is sintered. Thus, when the preform is subjected to steam sintering while maintaining the deaerated state, heat is transmitted to the whole of the preform uniformly and rapidly. As a result, it becomes possible to obtain a porous form provided with pores having uniform distribution and pore size. Accordingly, the sintering step with this heated steam is desirably carried out by a method in which a pipe for introducing steam and a valve for opening and closing this pipe are disposed in the pressure container, the preform is subjected to deaeration treatment, and the valve is opened while releasing the vacuum state or maintaining the vacuum state, thereby introducing heated steam.

The time required for sintering is appropriately determined according to conditions, such as size of the preform and sintering temperature, and is usually about 3-6 hours. The sintering time in other sintering methods is about 48-72 hours. From this fact, it can be understood that this sintering method is a production method with high production efficiency. After sintering, the preform is cooled to obtain the desired porous form. To prevent generation of cracking, etc., of the porous form due to quenching, cooling by allowing the preform to stand at room temperature is preferable for the cooling.

A method of forming the porous form into a sheet is not particularly limited. For example, cutting using a lathe, etc., can be employed. Processing is carried out according to purpose of use. For example, in using the UHMWPE porous sheet in optical disc units, it is usually processed in a flat ring-like form. This processing is carried out by stamping, etc.

The porosity of the UHMWPE porous sheet is set to a range of preferably 20-70%, more preferably 20-50%, and most preferably 30-50%. If the porosity is less than 20%, the coefficient of friction of the porous sheet tends to increase. On the other hand, if the porosity exceeds 70%, the mechanical strength of the porous sheet tends to decrease. The porosity can be adjusted by the specific gravity of the perform, the particle size of the UHMWPE powder, or the like. The porosity used herein is a proportion of voids to the apparent volume.

In general, the UHMWPE porous sheet has a thickness of preferably 0.02-0.50 mm, more preferably 0.03-0.30 mm, and most preferably 0.05-0.20 mm. If the thickness is less than 0.02 mm, the mechanical strength tends to decrease. On the other hand, if the thickness exceeds 0.50 mm, the thickness of the resulting sliding member may be too large.

To further decrease the coefficient of friction, the UHMWPE porous form may be impregnated with a lubricant such as silicone. Further, for the prevention of electrification, the UHMWPE porous form may be impregnated with a surfactant or an antistatic agent such as conductive polymers. Besides, carbon black or a conductive polymer may be mixed when molding, thereby imparting antistatic property.

A barrier layer is not particularly limited so long as it is made of a material exhibiting an appropriate adhesion to the porous sheet using UHMWPE, etc. For example, thermoplastic resins such as polyethylene or polypropylene are used. Such a thermoplastic resin is generally used in a sheet-like form. Further, a laminate sheet of thermoplastic resin sheets, or a laminate sheet of a thermoplastic resin sheet and a high-strength sheet such as polyethylene terephthalate or polyimides can be used as the barrier layer.

The resin sheet (barrier sheet) is adhered to the porous sheet to form a barrier layer. The adhesion method is, for example, a method in which a resin sheet and a porous sheet are passed between a pair of heated rollers, thereby heat fusing those. In that case, materials causing exudation from pore portions of the porous sheet are not desirable as a material of the barrier layer. For example, where a resin sheet used in the barrier layer has a very large volume to the porosity, the material of the barrier layer may cause exudation.

For those reasons, it is preferable to use a sheet obtained from, for example, a thermoplastic resin having a high melt viscosity as the resin sheet used in the barrier layer. The melt viscosity is preferably 5-500 kpa·s, and more preferably 10-200 kpa·s. The melt viscosity is measured by a viscoelasticity analyzer. The melt viscosity is a value measured at 200° C. and at a frequency of 1 rad/sec. Examples of such resins having a high melt viscosity include crosslinked polyethylene. The crosslinked polyethylene can be obtained by irradiating ordinary polyethylene with an appropriate dose of electron beams. When electron beams hit molecules of polyethylene, bonding occurs among the molecules, whereby a molecular structure having a three-dimensional bonding (crosslinking structure) is formed. The resin sheet using such a resin having a high melt viscosity can maintain a sheet shape to some extent even when the temperature reaches the melting point of the resin. Therefore, when such a sheet is used as the barrier layer, exudation of the barrier layer material from pores of the porous sheet does not occur.

The thickness of the barrier layer varies depending on the porosity or thickness of the porous sheet, but is generally about 0.01-0.5 mm, and preferably 0.02-0.05 mm. If the thickness of the barrier layer is less than 0.01 mm, inconvenience such as opening of pores of the porous sheet may occur. On the other hand, if the thickness exceeds 0.5 mm, the resulting sliding member may increase too much.

A pressure-sensitive adhesive layer is formed of a variety of pressure-sensitive adhesives. The pressure-sensitive adhesive is not particularly limited, and conventional pressure sensitive pressure-sensitive adhesives, such as acrylic pressure-sensitive adhesives, rubber based pressure-sensitive adhesives or silicone based pressure-sensitive adhesives, can be used. The kind of the pressure-sensitive adhesive used can appropriately be selected depending on the kind of an adherend or the barrier layer.

The pressure-sensitive adhesive layer can be formed by, for example, forming a double-sided pressure sensitive sheet having an pressure-sensitive adhesive layer formed on both surfaces of a substrate such as a polyethylene terephthalate film, and adhering a barrier layer to only one side of the double-sided pressure sensitive sheet. The pressure-sensitive adhesive layer may be formed by directly applying a pressure-sensitive adhesive to a barrier layer. The pressure-sensitive adhesive layer can also be formed by transferring a pressure-sensitive adhesive layer formed on a separator to a barrier layer. The surface of the barrier layer contacting the pressure-sensitive adhesive may be subjected to a treatment for easy adhesion, such as corona discharge, in order that the pressure-sensitive adhesive layer is strongly adhered to the barrier layer.

The thickness of the pressure-sensitive adhesive layer is not particularly limited. Where the pressure-sensitive adhesive layer is formed by adhering a double-sided pressure sensitive sheet to a barrier layer, the thickness of the pressure-sensitive adhesive layer is preferably about 0.01-0.3 mm, and more preferably 0.03-0.1 mm even in any case of the formation of the pressure-sensitive adhesive layer by coating or by transferring. If the thickness of the pressure-sensitive adhesive layer is less than 0.01 mm, sufficient adhesion to a recording medium, its drive unit, recording unit or the like, as an adherend may not be obtained. On the other hand, if the thickness exceeds 0.3 mm, the thickness of the resulting sliding member may become too large.

A separator may be laminated on the pressure-sensitive adhesive layer from the standpoint of handling property. The separator can be chosen according to the kind of pressure-sensitive adhesive and is not particularly limited. For example, a polyethylene terephthalate sheet to which a material having release property such as silicone resins is applied can be used. Plastic films to which the pressure-sensitive adhesive is relatively difficult to adhere, such as polyethylene or polypropylene, can also be used.

The present invention is described in more detail by reference to the following Examples, but it should be understood that the invention is not construed as being limited thereto.

Example 1

Preparation of Slidable Substrate:

An UHMWPE powder (molecular weight: 5,000,000, melting point: 135° C.) was charged in a mold and heat compressed at 125° C. to prepare a preform. The preform was further heated in a steam atmosphere at 160° C. to sinter, and then cooled to obtain a cylindrical porous form (porosity: 35%). The cylindrical porous form was cut into a sheet-like form having a thickness of 0.10 mm using a lathe, to obtain an UHMWPE porous sheet. This was used as a slidable substrate.

Formation of Barrier Layer:

A low density polyethylene sheet (thickness: 0.03 mm) was crosslinked by irradiation with electron beams to obtain a barrier sheet. The barrier sheet (crosslinked low density polyethylene) had a melt viscosity of 30 kpa·s (measured at 200° C. and at a frequency of 1 rad/sec using a viscoelasticity analyzer).

The UHMWPE porous sheet and the barrier sheet obtained above were adhered by passing those between a pair of rubber rollers heated at 135° C. at a rate of 0.5 m/min, thereby forming the barrier layer on the slidable substrate.

Formation of Pressure-Sensitive Adhesive Layer:

A coating solution was prepared by adding 1.2 parts by weight of benzoyl peroxide and 100 parts by weight of toluene to 100 parts by weight of a silicone based pressure-sensitive adhesive (KR101-10, manufactured by Shin-Etsu Chemical Co., Ltd.). The coating solution was applied to both surfaces of a polyethylene terephthalate film having a thickness of 0.025 mm and dried by heating at 130° C. for 10 minutes, to prepare a double-sided pressure sensitive tape. Each of the pressure-sensitive adhesive layers of the double-sided pressure sensitive tape had a thickness of 0.03 mm. A separator was adhered to one of the pressure-sensitive adhesive layers. This separator was a polypropylene sheet having a thickness of 0.05 mm.

The slidable substrate and the double-sided pressure sensitive tape were adhered with each other by passing those between rubber rollers at a rate of 0.5 m/min such that the barrier layer of the slidable substrate faces the pressure-sensitive adhesive layer (side on which no separator was adhered) of the double-sided pressure sensitive double tape. The temperature of the rubber rollers was 60° C. The resulting sheet was punched into a disk having a diameter of 10 mm to obtain a desired sliding member.

Comparative Example 1

A sliding member was obtained in the same manner as in Example 1, except that the barrier layer was not formed on the UHMWPE porous sheet.

Comparative Example 2

A sliding member was obtained in the same manner as in Example 1, except that a non-porous UHMWPE sheet was used as the slidable substrate.

The sliding members obtained above were evaluated in the following manners. The results obtained are shown in the Table below.

Coefficient of Friction

The coefficient of friction was measured using a sheet of polyethylene terephthalate as a counter material by a Bowden-Leben type friction tester under conditions of a sliding rate of 150 mm/min, a ball having a diameter of 12 mm as a contact surface, and a load of 200 g.

Exudation of Pressure-Sensitive Adhesive

A load of 600 N/cm$^2$ was applied to the sliding member in an atmosphere of 60° C. for 60 minutes. The sliding member was cut and microscopically observed as to what extent the pressure-sensitive adhesive moved. The evaluation was made on whether or not the pressure-sensitive adhesive reached the surface of the slidable substrate. The case where the pressure-sensitive adhesive reached the surface of the slidable substrate was judged as "Yes" of exudation, and the case where the pressure-sensitive adhesive did not reach the surface of the slidable substrate was judged as "No" of exudation.

TABLE

|  | Coefficient of friction | Exudation of pressure-sensitive adhesive |
|---|---|---|
| Example 1 | 0.08 | No |
| Comparative Example 1 | 0.08 | Yes |
| Comparative Example 2 | 0.20 | No |

As is apparent from the results shown in the Table above, the sliding member of the Example has a low coefficient of friction and therefore has good sliding property. Further, the sliding member of the Example is free from exudation of a pressure-sensitive adhesive. On the other hand, the sliding members of the Comparative Examples cannot satisfy the sliding property due to low coefficient of friction and the prevention of exudation of an pressure-sensitive adhesive at the same time.

It should further be apparent to those skilled in the art that various changes in form and detail of the invention as shown and described above may be made. It is intended that such changes be included within the spirit and scope of the claims appended hereto.

This application is based on Japanese Patent Application No. 2003-105196 filed Apr. 9, 2003, the disclosure of which is incorporated herein by reference in its entirety.

What is claimed is:

1. A sliding member comprising a slidable substrate; a pressure-sensitive adhesive layer provided on one side thereof; and a barrier layer,
    wherein the slidable substrate is a porous form having a porosity of 20-70% and comprises an ultrahigh molecular weight polyethylene;
    wherein the barrier layer is provided between the slidable substrate and the pressure-sensitive adhesive layer;
    wherein the barrier layer comprises a thermoplastic resin having a melt viscosity of 5-500 kPa·s.

2. The sliding member as claimed in claim 1, wherein the slidable substrate has a coefficient of friction of 0.2 or lower.

3. The sliding member as claimed in claim 1, wherein the ultrahigh molecular weight polyethylene has a molecular weight of 500,000 or higher.

4. The sliding member as claimed in claim 1, wherein the thermoplastic resin is a crosslinked polyethylene.

5. The sliding member as claimed in claim 1, wherein the barrier layer has a thickness of 0.01-0.5 mm.

6. The sliding member as claimed in claim 1, wherein the barrier layer comprises polyethylene or polypropylene.

7. The sliding member as claimed in claim 1, wherein one side of the barrier layer is adjacent to one side of the pressure-sensitive adhesive layer and the other side of the barrier layer is adjacent to one side of the slidable substrate.

* * * * *